United States Patent
Haasis, Jr.

[11] Patent Number: 5,902,618
[45] Date of Patent: May 11, 1999

[54] EFFICIENT FOOD CHILLING METHOD

[76] Inventor: Hans Haasis, Jr., 7587 Palos Verdes Dr., Goleta, Calif. 93117

[21] Appl. No.: 08/810,594

[22] Filed: Mar. 4, 1997

[51] Int. Cl.⁶ .......................... A21D 10/02; B65B 55/00; A23B 7/00

[52] U.S. Cl. .......................... 426/113; 426/393; 426/401; 426/405; 62/60; 62/69; 62/337; 62/455; 99/455; 99/470; 99/517

[58] Field of Search .................. 426/113, 393, 426/401, 405; 62/60, 69, 337, 455; 99/517, 470, 455

[56] References Cited

U.S. PATENT DOCUMENTS

| 271,892 | 2/1883 | McMurtry et al. | |
|---|---|---|---|
| 735,209 | 8/1903 | Carnochan. | |
| 2,520,556 | 8/1950 | Massey | 259/54 |
| 2,552,188 | 5/1951 | Krause et al. | 259/75 |
| 2,829,528 | 4/1958 | Hulick, Jr. | 74/86 |
| 3,316,734 | 5/1967 | Crane, Jr. | 62/381 |
| 3,430,926 | 3/1969 | Freedman et al. | 259/54 |
| 3,635,150 | 1/1972 | Piedallu | 99/489 |
| 3,685,308 | 8/1972 | Lundquist | 62/60 |
| 3,763,768 | 10/1973 | Norin | 99/483 |
| 4,132,458 | 1/1979 | Leek | 312/305 |
| 4,218,486 | 8/1980 | Bieler et al. | 426/412 |
| 4,336,274 | 6/1982 | Ross et al. | 426/643 |
| 4,437,315 | 3/1984 | Rica et al. | 62/63 |
| 4,473,739 | 9/1984 | Scheiwe et al. | 219/302 |
| 4,562,701 | 1/1986 | Newsome et al. | 62/187 |
| 4,606,262 | 8/1986 | Robinson, Jr. et al. | 99/470 |
| 4,619,191 | 10/1986 | Dumas et al. | 99/483 |
| 4,719,760 | 1/1988 | Takayuki | 62/65 |
| 4,901,633 | 2/1990 | De Longhi | 99/409 |
| 5,018,438 | 5/1991 | Grandi | 99/335 |
| 5,066,136 | 11/1991 | Johnson | 366/209 |
| 5,154,940 | 10/1992 | Bdzyna et al. | 426/232 |
| 5,263,334 | 11/1993 | Kado et al. | 62/137 |
| 5,280,748 | 1/1994 | Pardo | 99/330 |
| 5,285,719 | 2/1994 | McFadden et al. | 99/476 |
| 5,372,425 | 12/1994 | Tannenbaum et al. | 366/208 |
| 5,401,520 | 3/1995 | Skaar et al. | 426/524 |
| 5,423,603 | 6/1995 | Reynolds et al. | 366/208 |

Primary Examiner—Nina Bhat
Attorney, Agent, or Firm—Oppenheimer Wolff & Donnelly LLP

[57] ABSTRACT

An apparatus for chilling hot-bagged food includes a refrigeration device providing chilled air and an enclosure for containing the chilled air. A fan blows the chilled air in a stream within the enclosure and an open-work support movably holds a bag of hot food within the enclosure and in the path of the stream of chilled air. Thus, movement of the bag of hot food both agitates food within the bag and exposes surfaces of the bag to the stream of chilled air to rapidly cool the hot-bagged food. A method of processing food includes packaging and sealing a quantity of cooked hot food into a plastic bag then placing the plastic bag and hot food in an open-work basket movably mounted on a support. The plastic bag and hot food on the support are placed in a refrigerated-air environment and cold air is blown over the bag of food while it is moved to both shift the position of the bag and of the food contained in the bag to expose the bag of food to the blowing cold air and to shift the food in the bag to cool the food. A food-immersed temperature sensor assembly may be used to monitor the food cooling process.

13 Claims, 4 Drawing Sheets

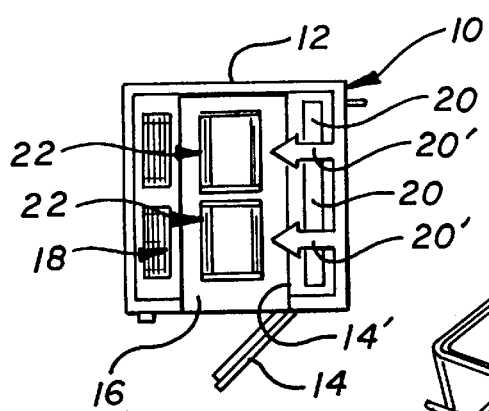
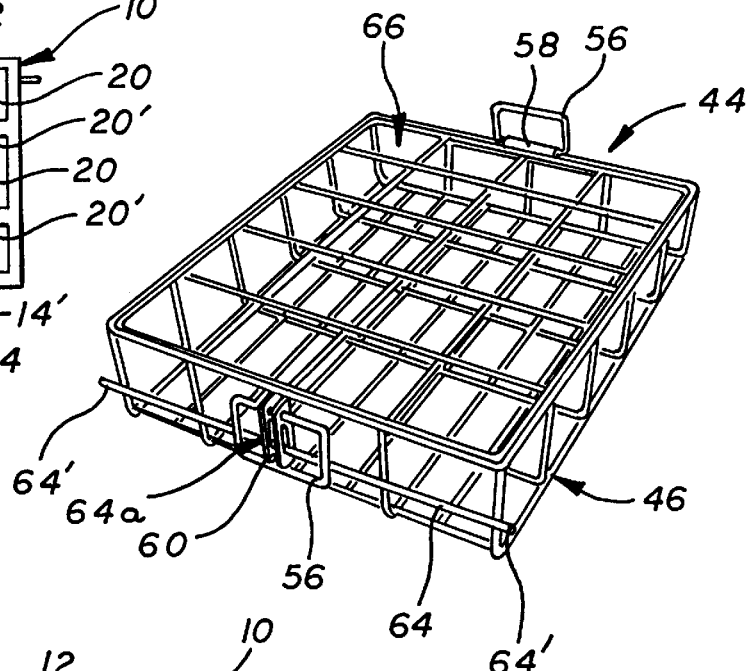
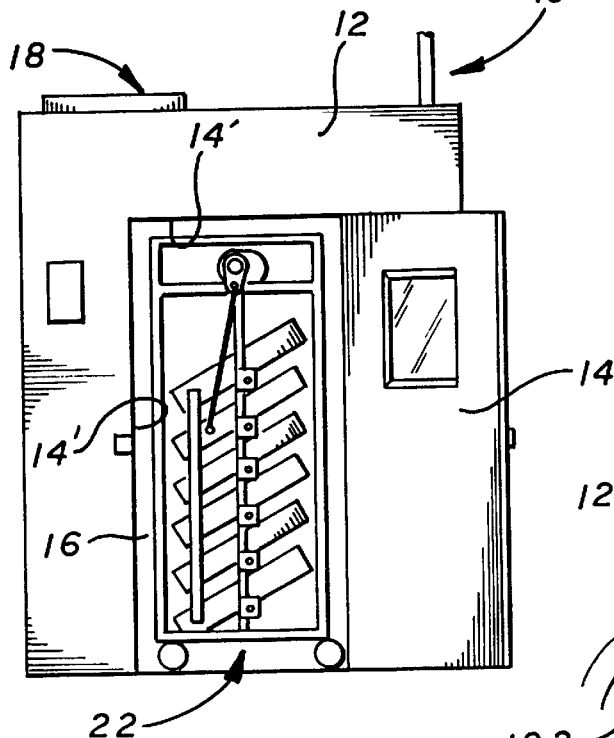
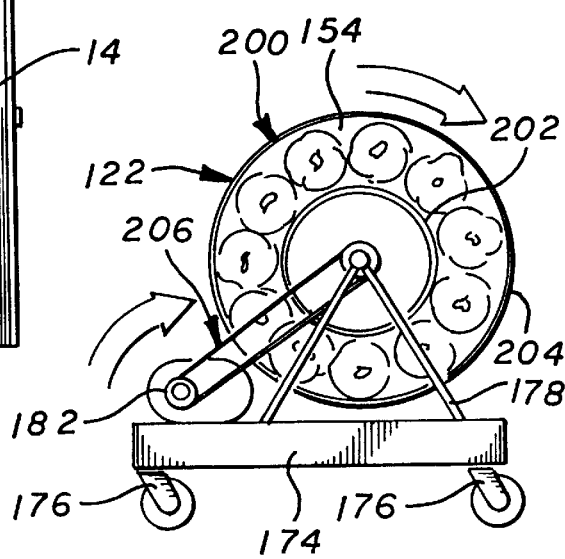

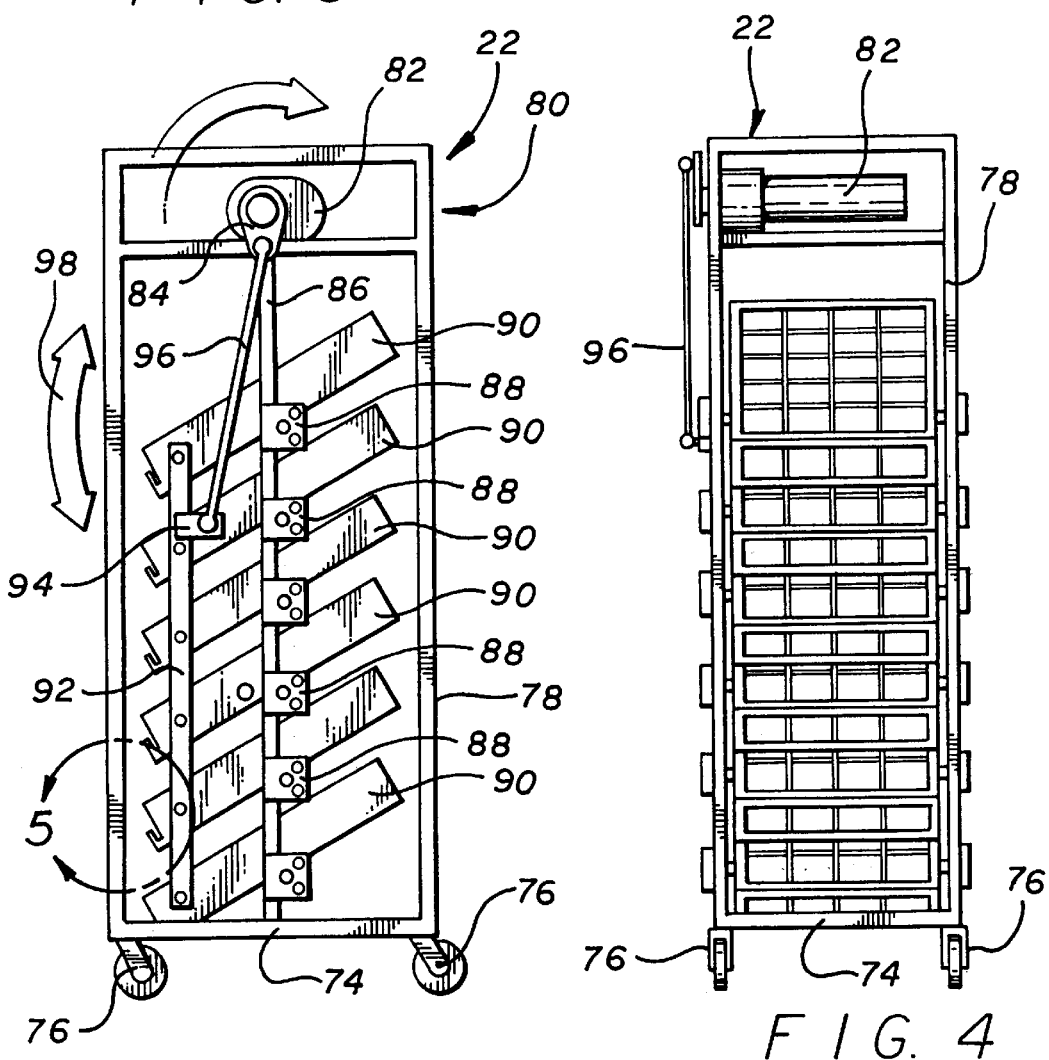
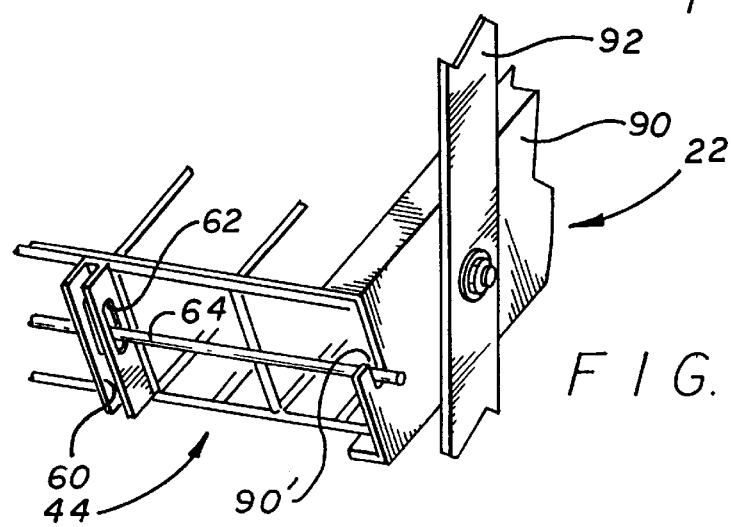

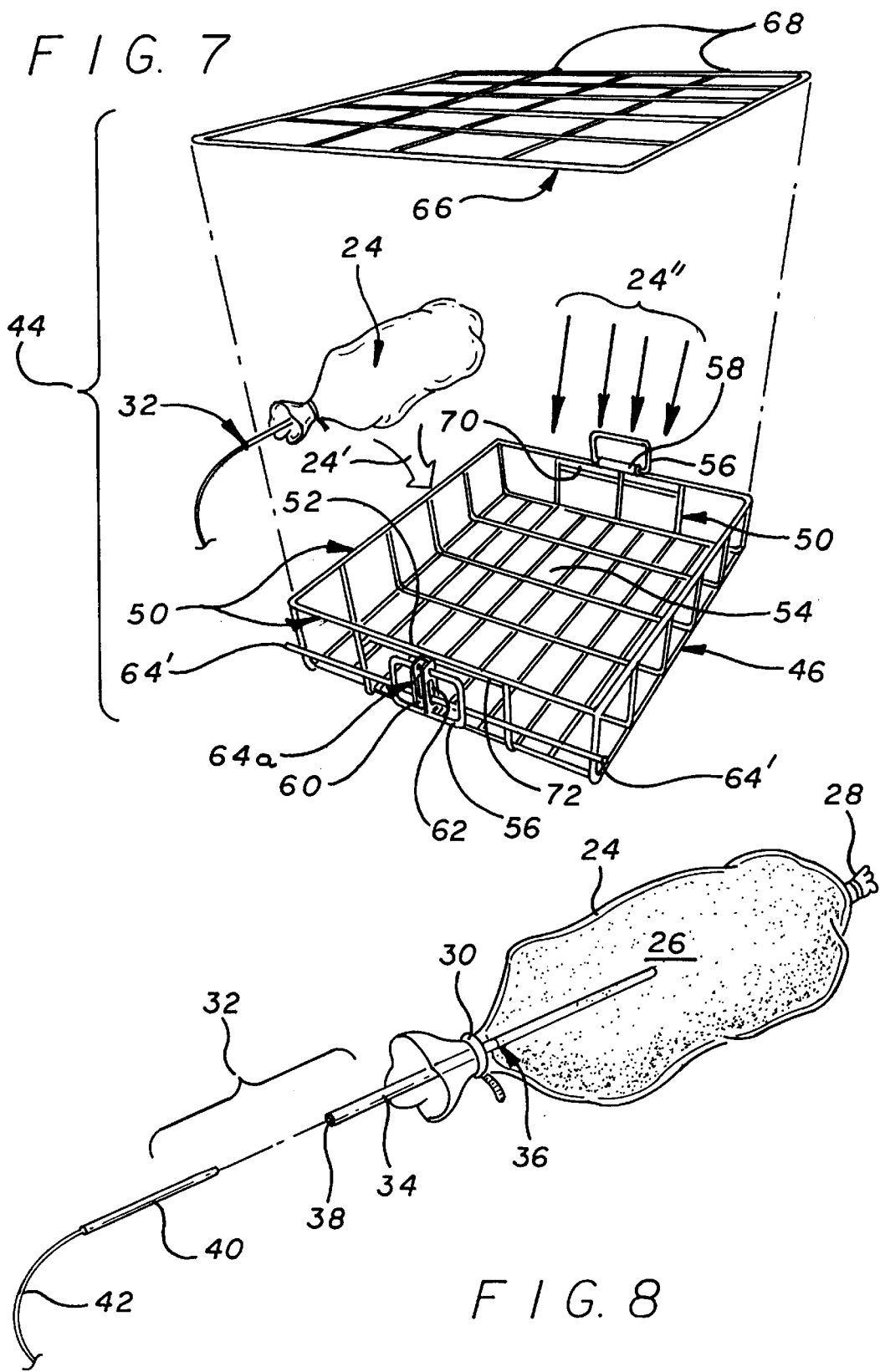

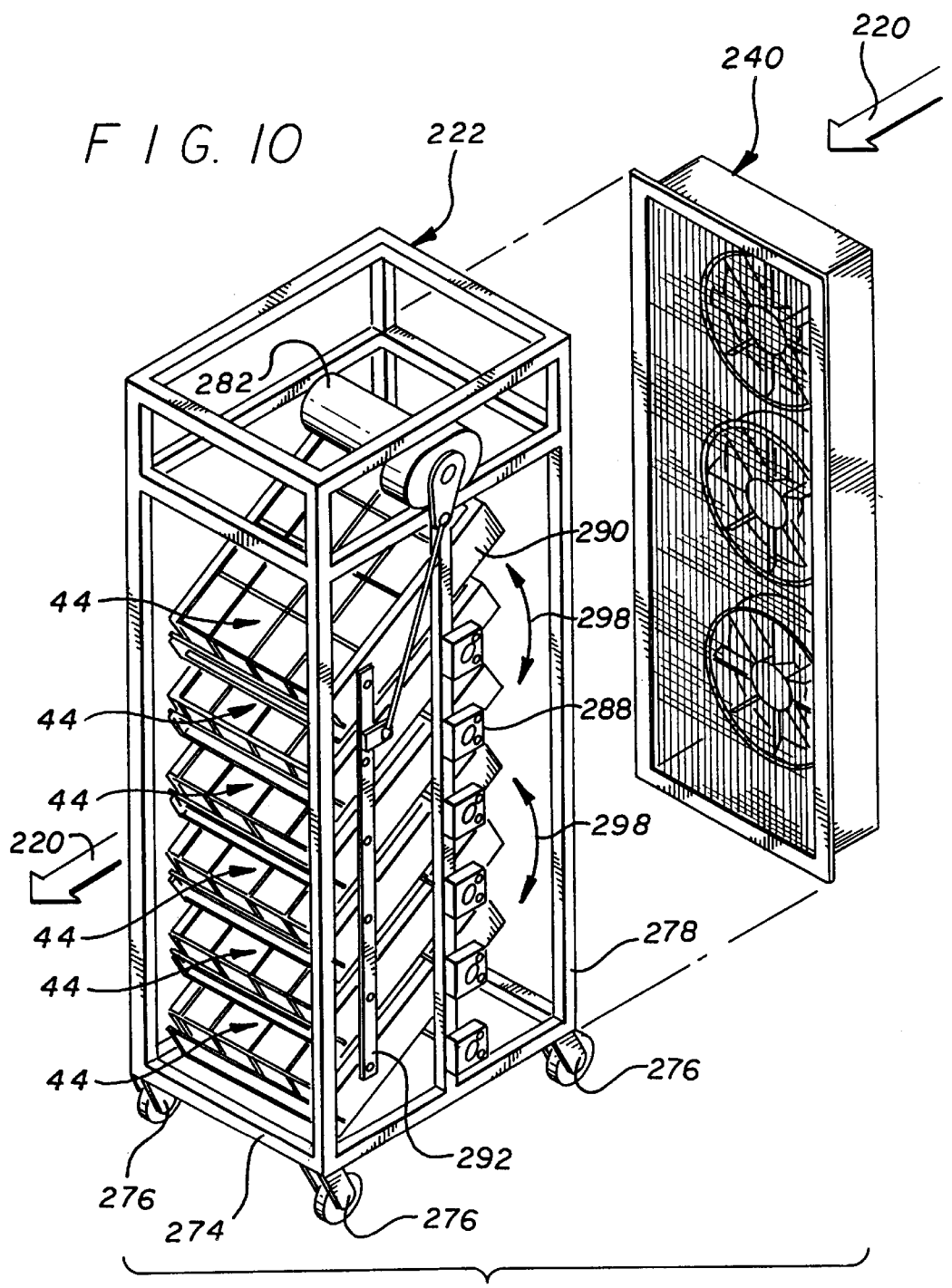

form basket or rack to hold the sealed bags of food, and locates the basket in an air blast chiller which directs very cold air (i.e., at a temperature well below freezing), across the bags of food while the food bags are oscillated or tumbled to agitate the food contents of the bags and insure complete and rapid chilling.
EFFICIENT FOOD CHILLING METHOD

BACKGROUND OF THE INVENTION

1. Field of the Invention

This invention relates to an improved method for rapidly and economically chilling large quantities of food; and to apparatus which may be used to practice this method.

2. Related Technology

For the preparation of large quantities of food and the storage of this food for later consumption, it has previously been proposed to cook the food in large batches, to seal the hot cooked food into plastic bags, and then to immerse the bags in ice cold water and agitate them to cool the food to about 40° F. While this method accomplishes the desired result, the required equipment is expensive to construct and operate, and is inconvenient to use. Either large quantities of ice or a water chiller must be used to maintain the desired very low temperature of the water; and it is necessary to dry the bags of food following water-immersion chilling.

SUMMARY OF THE INVENTION

Accordingly, it is a principal object of the present invention to accomplish the rapid chilling of food without the difficulties and inconvenience of the conventional method using cold water immersion, as described above.

The method in accordance with one preferred illustrative procedure, employs an open-work welded wire-form basket or rack to hold the sealed bags of food, and locates the basket in an air blast chiller which directs very cold air (i.e., at a temperature well below freezing), across the bags of food while the food bags are oscillated or tumbled to agitate the food contents of the bags and insure complete and rapid chilling.

A number of the open-work racks may be pivotally mounted and rocked up and down together, to agitate the bags of food. Alternatively, a large rotational cylindrical basket may hold a large number of the sealed bags of food providing both radially inner support and radially outer constraint to the bags, and may be rotated to tumble the bags for rapid, complete chilling.

Still alternatively, a number of the open-work racks may be pivotally mounted on a cart-like vehicle to be rocked up and down together, or a large cylindrical basket may be rotated on a cart-like vehicle while holding a number of the filled bags of food, and one or more fans may be associated directly with the vehicle to provide an air blast. The cart-like vehicle and filled food bags may be rolled into a commercial walk-in freezer so that the air blast is a blast of very cold air and is effective to cool the food very quickly.

When the food is sealed into the bags, it may be at a temperature of about 200° F. (i.e., close to the 212° F. or 100° C. boiling temperature of water). Generally, the bags will hold from one to two gallons of food, or more, so that cooling of this food would take some considerable time in room-temperature ambient conditions. Even when placed into a refrigerator, the bagged food would stay hot for some considerable time. Such slow cooling of the food (i.e., retention of the food of a temperature sufficient to allow growth of bacteria) would result in food spoilage and possibly in food poisoning for a human who consumed this food. In order to avoid the generation of bacteria in the warm food, it is desirable that the food be chilled to about 40° F. as rapidly as possible, and in all events within four hours.

For example, in a commercial food processing operation, a plurality of such cart-like vehicles would be used. At a food cooking and bagging facility, the filled bags would be placed on the cart-like vehicles. Then the cart-like vehicles would be rolled into an air-blast chiller or into a commercial walk-in freezer, for chilling of the food-filled bags as described above. This chilling of the food in bags takes some time, during which it is desirable to keep the chiller or freezer closed. Thus, material flow in this part of the facility would be on a batch basis. After chilling, the carts with chilled food would be rolled out the chiller or freezer for further processing, while other carts with hot bagged food are rolled into the chiller or freezer. Accordingly, use of several air-blast chillers or walk in freezers and a plurality of such cart-like vehicles would allow substantially continuous operation at the facility for cooking and bagging of food. In this way, a most efficient food processing may be achieved in terms of time, floor space, equipment required, material flow, and labor requirements.

Using an air blast chiller, such as those available from Omnitemp Industries, Inc., of 9301 Stewart and Gray Road, Downey, Calif. 90241, the temperature is brought down as described above in between one and two hours. The same is true if the alternative apparatus described above, and having one or more fans directly associated with a cart-like vehicle is used along with a walk-in freezer. Preferably, chilled air at a temperature of between +10° F. and −20° F. is blown over the bagged hot food to lower its temperature quickly to the desired level.

In order to provide the cart-like vehicles, pivotally mounted, oscillating supports for the open-work, wire-form racks may be mounted on carts having rollers. The carts include a power drive for the oscillating supports, and one or more carts may be rolled into the blast chiller or freezer and connected with an electrical power supply. The racks are then oscillated while the blast chiller or freezer is operated, and the rapid chilling process goes forward.

In accordance with one feature of the invention, a temperature sensor probe may be secured to one of the bags of food so that a temperature sensor can be inserted into the probe during chilling and the temperature of the food in this bag may be directly measured. In a preferred arrangement, the probe is configured as an elongate tubular housing open at one end and closed at the other. This probe is secured into the mouth of a filled bag of food at the time the bag is closed. The temperature sensor may extend into the sample bag of food within this probe. The temperature sensor itself may be associated with a temperature measuring instrument at the air-blast chiller or freezer, so that the temperature of chilling food within the bag is sensed. In this way, the chilling process for the warm food may be monitored, or completion of the process may be signaled when the food achieves a sufficiently low temperature.

Thus, according to one aspect, the present invention is seen to provide an apparatus for chilling hot-bagged food, the apparatus includes in combination: a refrigeration device providing chilled air; an enclosure for containing the chilled air; a fan for blowing the chilled air in a stream within the enclosure; an open-work support for movably holding the bag of hot food within the enclosure and in the path of the stream of chilled air, whereby movement of the bag of hot food both agitates food within the bag and exposes surfaces of the bag to the stream of chilled air to rapidly cool the hot-bagged food.

According to another aspect, the present invention provides a method for rapidly chilling hot cooked food from an elevated temperature on the order of about 200° F. to a low temperature on the order of about 40° F., the method comprising steps of: cooking food at an elevated temperature; packaging and sealing a quantity of the cooked food into a plastic bag while hot with a temperature near that of boiling water; placing the plastic bag and hot food in an open-work basket movably mounted on a support; placing the plastic bag and hot food on the support in a refrigerated-air environment; blowing cold air over the bag of food; moving the open-work basket on the support to shift the position of the bag and of the food contained in the bag both to expose the bag of food to the blowing cold air and to shift the food in the bag to cool the food.

A better understanding of the present invention will be obtained from reading the following description of several alternative preferred exemplary embodiments of the present invention, when taken in conjunction with the appended drawing Figures. In these appended drawing Figures the same features (or features analogous in structure or function) are indicated with the same reference numeral throughout the several views. It will be understood that the appended drawing Figures and description here following relate only to one or more exemplary preferred embodiments of the invention, and as such, are not to be taken as implying a limitation on the invention. No such limitation on the invention is implied by such reference, and none is to be inferred.

BRIEF DESCRIPTION OF THE DRAWING FIGURES

FIG. 1 provides a plan view of an air-blast chiller having a pair of cart-like vehicles according to the present invention inside in order to cool food product as is described;

FIG. 2 provides a side elevation view of the air-blast chiller and cart-like vehicles of FIG. 1 (on a larger scale), and is shown with the door of the chiller open to provide an appreciation of how the vehicles may be rolled in and out of the chiller;

FIGS. 3 and 4 are orthogonal side elevation views of a cart-like vehicle according to one embodiment of the invention;

FIG. 5 provides an enlarged fragmentary view of an encircled portion of FIG. 3;

FIG. 6 is a perspective view of a open-work, welded, wire-form rack which may be used on the cart-like vehicle seen in FIGS. 1–5;

FIG. 7 illustrates a step in a process of chilling food product in bags using the rack of FIG. 6, and also illustrates use of a food-temperature probe and temperature sensor;

FIG. 8 provides an enlarged isolation view of a food processing bag with food-temperature probe and temperature sensor as seen in FIG. 7;

FIG. 9 is an end elevation view of an alternative embodiment of a cart-like vehicle for use in practicing the food-chilling method of the present invention; and FIG. 10 provides an exploded side elevational view of still another alternative embodiment of a cart-like vehicle for use in practicing the food-chilling method of the present invention using a walk-in freezer.

DETAILED DESCRIPTION OF AN EXEMPLARY PREFERRED EMBODIMENT OF THE INVENTION

Considering first FIGS. 1 and 2, a conventional air-blast chiller 10 is shown in plan and side elevation views (and in differing scales in the two Figures). This air-blast chiller 10 includes a chambered and insulated housing or cabinet 12 provided with a door 14 (and door way 14') opening to the interior 16 of the chiller. The interior air of the cabinet 12 is chilled by a refrigeration unit, generally indicated with the numeral 18. Also, the air-blast chiller 10 is interiorly provided with fan units (indicated with numeral 20 and best seen in FIG. 1) which vigorously circulate the chilled air in interior 16 (as is indicated by arrows 20' on FIG. 1). Those ordinarily skilled will know that the air-blast chiller 10 includes a perforate wall plate though which chilled air is distributed for horizontal flow across the interior 16. This chilled air is recirculated via an overhead plenum (not shown) for efficiency of refrigeration. Within the chiller 10 of FIGS. 1 and 2, a cart-like vehicle 22 (hereinafter, simply referred to as a "cart") is shown for holding and oscillating processing racks filled with bags of food to be chilled, as will be further explained below.

Turning now to FIGS. 6, 7 and 8, steps in the process of chilling food which has been cooked in large batches (and apparatus for this use) is illustrated. It will be recalled that for the preparation of large quantities of food and the storage of this food for later consumption, it is desirable to cook the food in large batches, to seal the hot cooked food into plastic bags, and then to quickly cool the food to about 40° F. so as to prevent the growth of bacteria. As pointed out above, this process has conventionally and undesirably involved the use of large quantities of ice or chilled water to cool the hot cooked food. In contrast, the present invention provides method and apparatus to accomplish this chilling of hot cooked food without the use of ice or chilled water, and in a controlled and repeatable manner assuring that the hot food achieves a sufficiently cool temperature in an adequate time interval.

Viewing FIG. 8 in particular, a food processing plastic bag 24 is shown filled with a quantity 26 of cooked food for chilling. The bag 24 is tubular, and is formed of a length of plastic tubing into which the food is discharged from a processing machine. This type of plastic bag allows for nearly continuous operation at a bag filling machine (not shown). The far end of the bag is sealed by use of a "hog ring" type of clamp 28 which is automatically applied by the filling machine. After filling of the bag 24, the near end of the bag is sealed by a "wire tie" type of band 30. However, in this particular bag of food, the opening at the near end has a temperature sensing assembly 32 inserted into the bag and held in place by the band 30. The temperature sensing assembly includes two parts, one of which (a reusable tubular probe) is sealed in association with the bag 24, and the other of which (a temperature sensing element) is associated with instrumentation or control devices located at the chiller 10, as will be further explained. For purposes of illustration and explanation, these two parts of the temperature sensing assembly 32 are shown together in FIG. 8.

More particularly, the temperature sensing assembly 32 includes a tubular probe part 34 which is preferably formed of metal having a high coefficient of heat transfer. Most preferably, this probe part may be formed of thin-walled aluminum tubing, or of thin-walled stainless steel tubing. The probe part 34 has a closed end, indicated with arrowed numeral 36, and an open end 38 (i.e., defining an opening also indicated with this same numeral). During chilling of the food within bag 24, a second part of the temperature sensing assembly 32 is inserted into the probe part 34 in order to sense the temperature of the food 26. This second part of the temperature sensing assembly 32 is a temperature sensing element 40. From temperature sensing element 40, a wire 42 extends to a temperature indicating, recording, or process control device (not shown). The device with which temperature sensing element 40 is associated is located at or in association with the chiller 10 in order to allow the chilling of food in bag 24 to be monitored.

Considering now FIGS. 6 and 7, a rack 44 for use in holding the bag 24 (and a plurality of similar bags also holding food to be chilled, as will be explained) is illustrated. This rack 44 is of open-work, welded, wire-form construction. In other words, the rack 44 is made of large wire or small metal rod formed and welded together to form the structure illustrated in FIGS. 6 and 7. Considering these Figures in greater detail, it is seen that the rack 44 includes a base portion 46 having a floor 48 and four side walls 50 cooperatively defining an upper opening 52 to an interior chamber 54 of the rack. The base portion 46 has a pair of handles 56 located at opposite ends of the base portion. One of the handles 56 is carried pivotally in a formed sheet metal clip 58 welded to the wire form structure.

The other handle 56 is carried pivotally in a U-shaped vertically extending bracket 60 having a vertically extending slot 62 in which is received a central portion of a catch rod 64. The catch rod 64 includes a central collar (not seen in the drawing Figures but indicated with the arrowed numeral 64a) located on the rod between the legs of the U-shaped bracket 60 in order to keep the rod from sliding out of the bracket. At opposite ends thereof, the rod 64 includes protruding end portions 64' which extend slightly (i.e., about one-half inch) beyond the base portion 46.

In order to retain bags of food within this rack 44 while it is being handled or oscillated on the cart 22, a lid portion 66 is provided. In other words, with the lid 66 in place, the rack 44 encloses the bags of food. The lid portion 66 is also of open-work, welded wire-form construction, as is seen in FIGS. 6 and 7. The lid portion 66 at one end includes a pair of protruding stem parts 68, which are received into respective slots 70 defined at a corresponding end of the base portion 46 by a pair of horizontally extending and vertically spaced apart parts of the wire-form construction. At the opposite end of the lid portion, this lid rests upon a U-shaped horizontally extending shelf rod 72 welded into the wire-form structure of the base portion 46 slightly below the opening 52. Thus, the lid portion 66 is received into the opening 52, and rests in this opening by its own weight to retain bags of food in the chamber 54 of the rack 44.

As is seen in FIG. 7, a bag of food 24, like the one described in connection with FIG. 8 is received into the chamber 54 of a rack 44, as is indicated by the arrow 24'. The plural arrows 24" indicate that plural additional bags of food (not individually shown) are also received into rack 44. The additional bags of food need not include the temperature sensing probe 32 indicated for bag 24.

Now considering FIGS. 3, 4, and 5 in greater detail, the cart 22 for holding and oscillating plural bags of food in the air-blast chiller 10 is depicted. Cart 22 includes a base portion 74 having wheeled casters 76 so that the cart 22 can be manually wheeled about a food processing facility, and in and out of the air blast chiller 10. On the base portion 74 is secured an open frame work 78 supporting a top structure 80. The top structure 80 carries a gear-head motor 82 which on its rotational output shaft carries a crank arm 84. A pair of vertical frame members 86 (only one of which is seen in the drawing Figures) are spaced apart on opposite sides of the frame work 78, and each carries a plurality of vertically spaced apart bearing journal plates 88. Pivotally supported on the bearing journal plates 88 is a vertically spaced apart group of U-shaped shelf-brackets 90.

At an open end of these shelf-brackets 90, each defines a vertically extending notch 90' for receiving an end portion 64' of the catch rod 64, viewing FIG. 5 in particular. In order to unite the shelf-brackets 90 for pivotal oscillation in unison, a pair of vertically extending unison bars 92 (only one of which is seen in the drawing figures) connects pivotally to each shelf-bracket 90. One of the unison bars (seen in FIG. 3) includes a tab 94 to which pivotally connects a tie rod 96. At its upper end, the tie rod rotationally connects to an outer extent of the crank arm 84. Thus, when the crank arm 84 is rotated by motor 82, the shelf-brackets 90 all pivot in unison, as is indicated by arrow 98, viewing FIG. 3. Alternatively, the shelf-brackets 90 my be united in horizontally aligned pairs by respective open-work back wall portions connecting between the shelf-brackets at their ends opposite the notch 90'. In this alternative construction, only a single unison bar 92 is needed. Although it is not seen in the drawing Figures, it will be understood that a power cord with plug extends from the gear head motor 82. Thus, as will be explained, the power cord is plugged into a power outlet within chiller 10 in order to effect oscillation of the racks 44.

As is seen in FIG. 4 (and partially in FIG. 5) a plurality of the racks 44 (each holding plural bags of food 24) may be placed into the shelf-brackets 90 of a cart 22. FIGS. 1 and 2 show that plural (in this case two—although such is not a limitation) of the carts 22 may be rolled into an air-blast chiller 10. Once the carts 22 are inside of the chiller 10, the temperature sensor 40 is inserted into the one bag 24 of food out of each batch which is provided with the probe 34. Ordinarily, only one bag of food in each batch being chilled together, or on each cart 22 will be provided with a probe to allow sensing of the temperature of food in this bag. It is understood that more than one bag of food can be so provided with a temperature sensing assembly, but this is not ordinarily required because the bags of food all receive good circulation of chilled air and agitation of the food in the bags, so they all cool at essentially the same rate. Thus, when the temperature sensor 40 indicates that the one bag of food has reached a satisfactorily cold temperature, all of the food bags being chilled together can be removed from the chiller 10.

Once the temperature sensor 40 is inserted into the probe 34, and the power cords of the carts 22 are plugged in (i.e., so that oscillation of the racks begins or can be started by closing a switch), the chiller 10 is closed and the air-blast of refrigerated air proceeds. After chilling of the food (which may be indicated by an attendant watching a temperature gauge associated with sensor 34, or by sounding of a signal in response to the sensed temperature dropping to a set level, for example), the carts 22 with chilled food are rolled out the chiller 10 for further processing.

FIG. 9 illustrates an alternative embodiment of a cart apparatus for use in practicing the method of bagged food chilling presented here. In order to obtain reference numerals for use in describing this embodiment of the invention, features which are the same as those described above (or which are analogous in structure or function) are indicated on FIG. 9 with the same numeral used above, and increased by one-hundred (100). Viewing FIG. 9, a cart 122 includes a base 174 with wheeled casters 176. The base supports a frame work 178 in which is rotationally carried an open-work rotational drum structure 200. The drum structure is effectively a large rotational cylindrical basket which has a door (not shown) allowing it to receive and hold a large number of the sealed bags of food.

The drum structure 200 is providing both radially inwardly and radially outwardly of the bags of food with open-work structures 202 and 204. These open-work structures 202 and 204 respectively support the bags of food radially inwardly, and provide radially outer constraint to these bags. In other words, these open-work structures cooperatively define an annular chamber 154 for enclosing the bags of hot food. The drum structure 200 is rotated by gear-head motor 182, by use of a flexible-element drive 206 (i.e., a belt trained over sheaves, or a chain on sprockets, for example) to tumble the bags in a chiller 10 for rapid, complete chilling generally as described above. However, it will be noted that this embodiment of FIG. 9 does not provide for one of the bags of food to be connected to a remote temperature monitoring or indicating device. On the other hand, the food chilling process can be controlled satisfactorily and with good repeatability after sufficient experience simply by reference to a time interval of chilling. Also, because of its smooth rotary motion (as opposed to oscillatory motion), the cart 122 of FIG. 9 may be preferred by some users.

FIG. 10 illustrates another alternative embodiment of the invention. In order to obtain reference numerals for use in describing this embodiment of the invention, features which are the same as those described above (or which are analogous in structure or function) are indicated on FIG. 10 with the same numeral used above, and increased by one-hundred (200) over FIGS. 1–8. Viewing FIG. 10, a cart 222 is shown in exploded perspective view. It is seen that the cart 222 is essentially the same in most respects with the cart 22 described above. Importantly, however, the cart 222 is configured to allow the apparatus shown to be used with a conventional walk-in commercial freezer to practice the food chilling method described here. That is, cart 222 is additionally provided with a fan unit 240. The fan unit 240 may be electrically powered by the same power connection used for the gear head motor 282.

This fan unit is preferably attached to the cart 222 at one of the sides other than the one through which the racks 44 are inserted. Most preferably, and as seen in the embodiment of cart 222 illustrated in FIG. 10, the cart has the fan unit 240 advantageously attached opposite to the side of the cart through which the racks 44 are inserted and removed from the shelf-brackets 290 (recalling the description above of cart 22). This places the air flow from the fan unit 240 in the plane of oscillation of the racks 44. That is, considering the oscillation direction of the racks 44, and the air flow direction provided by the fan unit 240 (both indicated by arrows on FIG. 10), it is seen that this arrangement of the fan unit on cart 222 provides the best exposure of the filled bags of food to the chilled air blast.

The embodiment of cart 222 seen in FIG. 10 can be used to practice the food chilling method described simply by placing the cart in a commercial walk-in freezer, providing power to the cart for oscillation of the racks 44 and operation of the fan unit 240, and operating the freezer to provide refrigerated air to be blown over the bags 24 by the fan unit 240. If desired, the freezer may be provided with a temperature monitoring or indicating device.

While the present invention has been depicted, described, and is defined by reference to several particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. For example, several mechanical alternatives to oscillation or tumbling of the filled food bags suggest themselves. For example, the filled food bags could be placed on an open work "lazy susan" with several levels one above the other. Such a "lazy susan" or turntable configuration of open-work cooling cart would provide for rotation of the turntables in the air blast in order to cool the hot prepared food. Other such expedients will suggest themselves to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for rapidly chilling hot cooked food from an elevated temperature on the order of about 200° F. to a low temperature on the order of about 40° F., said method comprising steps of:

cooking food at an elevated temperature;

packing and sealing a quantity of the cooked food into a plastic bag while hot with a temperature near that of boiling water;

inserting a temperature probe into the plastic bag containing the hot food;

placing at least one plastic bag containing hot food in an open-work basket movably mounted on a support;

placing the plastic bag and hot food on said support in a refrigerated-air environment;

blowing cold air below 32° F. over the bag of food;

moving the open-work basket on the support to shift the position of the bag and to tumble the food contained in the bag both to expose the bag of food to the blowing cold air and to shift the food in the bag to cool the food;

measuring the temperature of the food within the bag; and said method including restraining and limiting movement of said bag of food relative to said open-work basket;

whereby said food is rapidly changed in temperature while the food changes position within the bag but is not subject to damaging shock which could impair the quality of delicate foods, and wherein the temperature of said food may be monitored in the course of said method.

2. A method as set forth in claim 1 including the step of maintaining the cold air at a temperature of between +10° F. and −20° F.

3. A method as set forth in claim 1 wherein the step of moving the basket is accomplished by oscillating the open-work basket back and forth through an angle to tilt the bag of food.

4. A method as set forth in claim 1 wherein an elongate plastic bag is used to receive the food, and the step of moving the basket is accomplished by oscillating the open-work basket back and forth through an angle to tilt the bag of food in a plane along its length, and cold air is blown over the bag of food in a direction generally parallel with the plane of tilting of the bag.

5. A method as defined in claim 1 wherein a plurality of bags of food of said bag of hot food are placed in each of a plurality of open-work baskets of said open-work basket, each of said plurality of open-work basket being movably mounted on said movable support and wherein this plurality of open-work baskets are tilted back and forth in unison.

6. A method as defined in claim 5 wherein said movable support is rolled in and out of said refrigerated-air environment on wheels carrying said support.

7. A method as defined in claim 1 wherein said basket is rotated to tumble the bags of food.

8. A method as defined in claim 1 including the additional step of sensing the temperature of the food being cooled.

9. A method as defined in claim 8 including the additional step of continuing the chilling process until the temperature of the food is lowered to about 40° F., followed then by stopping said chilling process.

10. A method as defined in claim 8 including the steps of using an elongate temperature probe extending into a sealed bag of food, and a temperature sensor mounted into said probe to sense the food temperature as the food is being chilled.

11. A method for rapidly chilling hot food, said method comprising steps of:

placing a quantity of hot food into a plastic bag;

sealing the bag;

placing the bag in movable basket configured to allow substantially free air flow therethrough; and blowing cold air below 32° F. through the basket and over the bag of food while moving the basket to both agitate food in the bag and expose differing exterior surface portions of the bag to the blowing cold air;

whereby said food is rapidly changed in temperature while the food changes position within the bag but is not subject to damaging shock which could impair the quality of delicate foods.

12. A method for expediently changing the temperature of food, said food having an initial temperature, and said method comprising steps of:

packaging and sealing a quantity of food into bags;

placing the bags and food in an enclosed open-work basket movably mounted on a support;

locating the bags and food on said support in a moving-air environment;

providing the air in said moving-air environment with a temperature differing from said initial temperature of said food by more than 100° F.;

moving the open-work basket on the support to shift the position of the bags and to tumble the food contained in the bags both to expose the bags of food to the moving-air environment and to shift the food in the bags to change the temperature of the food by heat exchange with the moving air; and said method including restraining and limiting movement of said bags of food relative to said open-work basket and maintaining the relative position of each bag of food relative to other bags of food;

whereby said food is rapidly changed in temperature while the food in each bag is changed in position within the bag but is not subject to damaging shock which could impair the quality of delicate foods.

13. The method as defined in claim 12 wherein said bag is made of flexible plastic.

* * * * *